United States Patent [19]

Webb et al.

[11] Patent Number: 5,428,744

[45] Date of Patent: Jun. 27, 1995

[54] OBJECT-ORIENTED SYSTEM FOR BUILDING A GRAPHIC IMAGE ON A DISPLAY

[75] Inventors: Richard D. Webb; Arthur W. Cabral, both of Sunnyvale, Calif.

[73] Assignee: Taligent, Inc., Cupertino, Calif.

[21] Appl. No.: 113,442

[22] Filed: Aug. 30, 1993

[51] Int. Cl.$^6$ ............................................. G06F 12/00
[52] U.S. Cl. ................................... 395/164; 395/127; 395/133; 395/160
[58] Field of Search ................ 395/119, 120, 125, 127, 395/133–139, 140–143, 161, 160, 162–164, 425; 364/200 MS File, 900 MS FIle

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 395/775 |
| 4,891,630 | 1/1990 | Friedman et al. | 345/156 |
| 4,953,080 | 8/1990 | Dysart et al. | 395/600 |
| 5,041,992 | 8/1991 | Cunningham et al. | 395/135 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419.19 |
| 5,265,206 | 11/1993 | Shackelford et al. | 364/DIG. 1 |
| 5,307,451 | 4/1994 | Clark | 395/127 |

OTHER PUBLICATIONS

1990 Winter Simulation Conference Proceedings Dec. 1990, pp. 118–122, Belanger, "Modism II-A Modular Object Oriented Language".

ACTA Polytechnica Scandinavica Mathematics and Computer Science Series 1987, Finland, pp. 1–30, Takala "Methological and Structural Principles for Flexible Geometric Modeling in Computer Aided Design".

Seybold Report on Desktop Publishing, vol. 2(3), 11/87, US, pp. 55–56 "Aldus's FreeHand Drawing Program".

Graphics and Communications Proceedings of an International Workshop, Oct. 1990, Germany, pp. 115–136, Fellner et al. "PIC-A Metafile Format for Distributed Graphics Applications".

Byte, V.15(5), 5/90, US, pp. 287–294, Urlocker "Object Oriented Programming for WIndows".

*Primary Examiner*—Mark R. Powell
*Assistant Examiner*—Kee M. Tung
*Attorney, Agent, or Firm*—Keith Stephens

[57] ABSTRACT

A method and system for processing graphic objects on a computer with a memory and an attached display and performing binary constructive area geometry (CAG) operations on area-defining geometries such as rectangle, ellipses, and polygons in an object oriented operating system. The operations include the construction of an area and the display of area geometries on an external device. The system allows application programmers to efficiently develop and share software for displaying a plurality of complex views including overlapping views and translucent views.

30 Claims, 16 Drawing Sheets

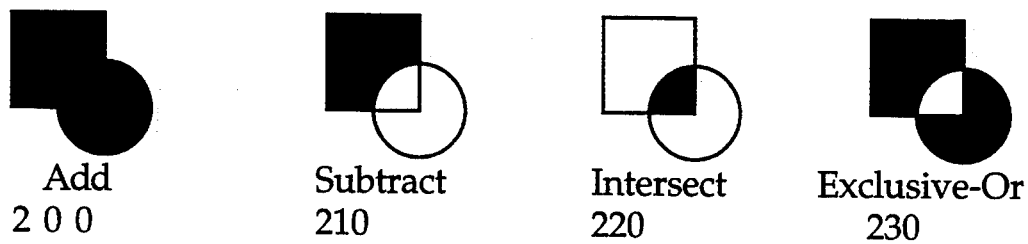
Add
200
Subtract
210
Intersect
220
Exclusive-Or
230
FIGURE 2
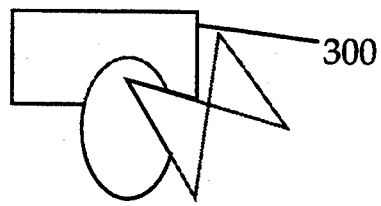
FIGURE 3
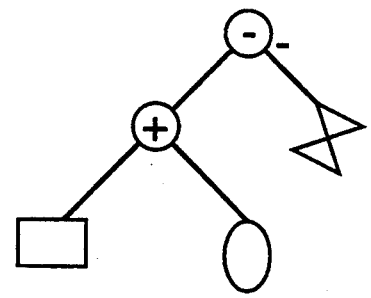
FIGURE 4
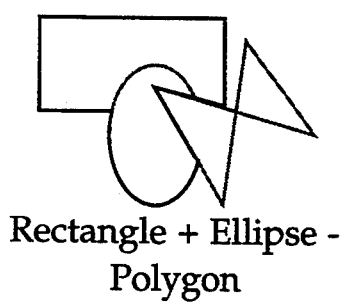
Rectangle + Ellipse -
Polygon
FIGURE 5
```
TGArea myArea (myRectangle);
myArea += TGArea (myEllipse);
myArea -= TGArea (myPolygon);
myPort.Draw (myArea, myBundle);
```
FIGURE 6

1400

RECT + ELLIPSE

1410

OBJECT-ORIENTED SYSTEM FOR BUILDING A GRAPHIC IMAGE ON A DISPLAY

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems and more particularly to a system and method for processing area information for one or more arbitrary graphic objects on a graphic display.

BACKGROUND OF THE INVENTION

Graphic processing of area information is a critical problem for presenting graphical information in an, efficient, ergonomic manner. Thus, modern graphic systems, which utilize information-handling systems that are designed to process a wide variety of information, including text and graphic information, are becoming increasingly sophisticated so as to process this information in a more efficient manner.

Prior software operating system architectures are limited in their area processing capability. A limitation is that the operating system architecture may not be able to support a given peripheral device for which the architecture was not designed or could not be modified to support. Also, a prior architecture may only process graphic area information in a single, pre-defined manner.

SUMMARY OF THE INVENTION

Accordingly, it is a primary objective of the present invention to process graphic objects, and their associated areas, on a computer with a storage and an attached display in a flexible manner. A set of classes are defined in the storage representative of geometric figure primitives. Then, another set of classes are created in the storage representative of a plurality of geometric figure operations. At least one geometric figure operation is applied to a first and a second geometric figure to create resultant geometric figure, and the resultant geometric figure is displayed on the display. The classes can be readily subclassed to support new hardware environments.

BRIEF DESCRIPTION OF THE DRAWINGS

FIG. 2 is a graphical illustration of various arithmetic functions being applied to graphic objects in accordance with a preferred embodiment;

FIG. 3 is an illustration of a rectangle plus an ellipse minus a polygon (Rectangle+Ellipse−Polygon) in accordance with a preferred embodiment;

FIG. 4 is a binary tree structure of a rectangle plus an ellipse minus a polygon (Rectangle+Ellipse−Polygon) in accordance with a preferred embodiment;

FIG. 5 is an example of a graphic area in accordance with a preferred embodiment;

FIG. 6 is an example of the C++ source code used to construct the graphic area illustrated in FIG. 5 in accordance with a preferred embodiment;

DETAILED DESCRIPTION OF THE INVENTION

Figure 1:
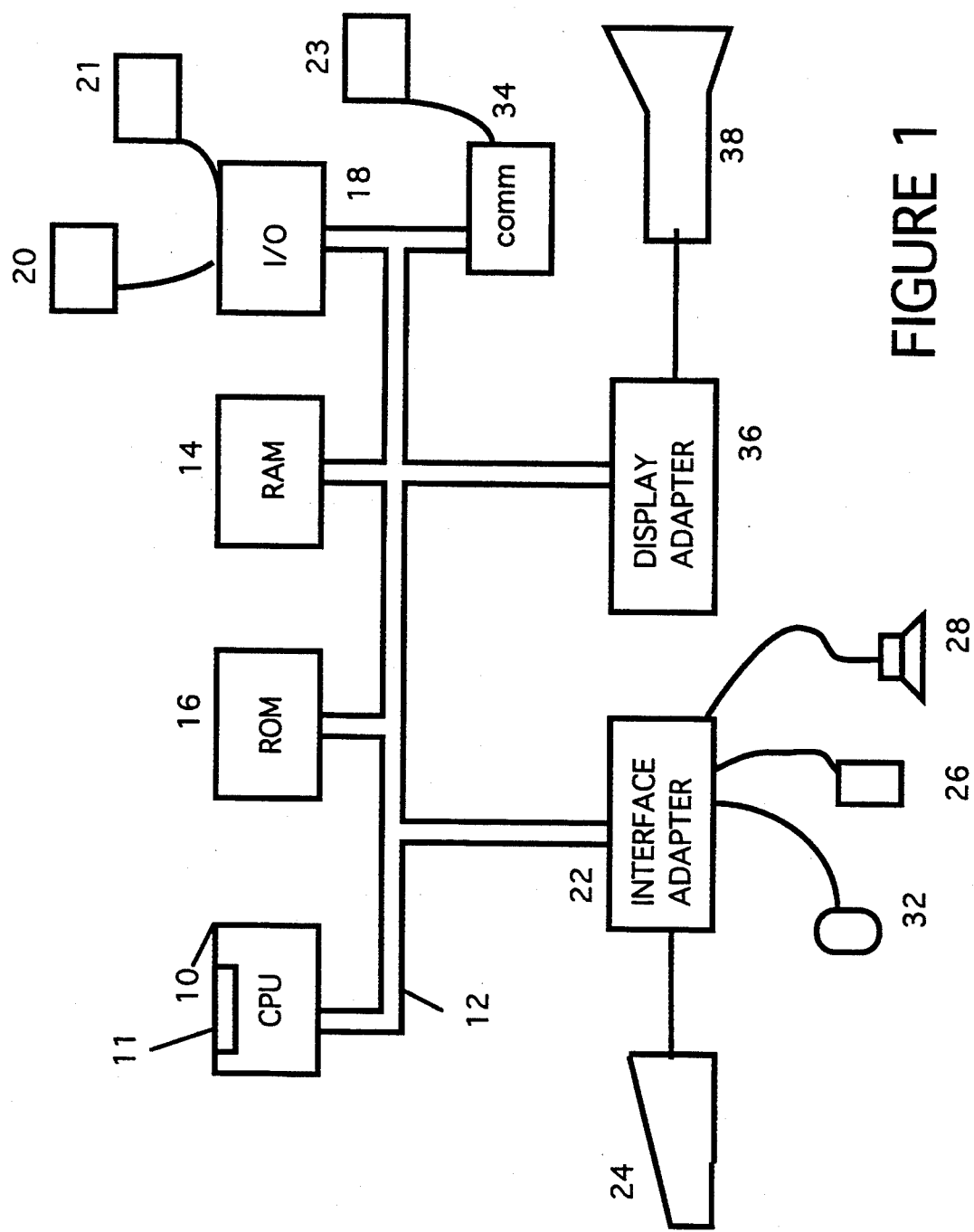
FIG. 1 is a block diagram of a personal computer system in accordance with a preferred embodiment.

The invention is preferably practiced in the context of an operating system resident on a personal computer such as the IBM ® PS/2 ® or Apple ® Macintosh ® computer. A representative hardware environment is depicted in FIG. 1, which illustrates a typical hardware configuration of a computer in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The computer has resident thereon an operating system such as the Apple System/7 ® operating system.

OBJECT ORIENTED PROGRAMMING

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and determines, according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise because it is easy for a developer to reuse their own objects, it is difficult to use objects from other systems, and a developer still needs to reach into the internal, non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scroll bars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and system integrators have acquired expertise in particular areas, such as manufacturing, accounting, or currency transactions. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations which have acquired expertise in vertical markets such as manufacturing, accounting, or bio-technology have a distribution mechanism for packaging, reselling, and deploying their expertise, and furthering the progress and dissemination of technology.

Historically, frameworks have only recently emerged as a mainstream concept on computing platforms. This migration has been assisted by the availability of object-oriented languages, such as C++. Traditionally, C++ was found mostly on UNIX systems and researcher's workstations, rather than on computers in commercial settings. It is languages such as C++ and other object-oriented languages, such as Smalltalk and others, that enabled a number of university and research projects to produce the precursors to today's commercial frameworks and class libraries. Some examples of these ARE InterViews from Stanford University, the Andrew toolkit from Carnegie-Mellon University and University of Zurich's ET++ framework.

There are many kinds of frameworks depending on the level of the system and the nature of the problem. The types of frameworks range from application frameworks that assist in developing the user interface, to lower level frameworks that provide basic system software services such as communication, printing, file systems support, graphic, etc. Commercial examples of application frameworks are MacApp (Apple), Bedrock (Symantec), OWL (Borland), NeXTStep App Kit (NEXT), and Smalltalk-80 MVC (ParcPlace).

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In a similar way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the system. For the commercial or corporate developer, system integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment is essentially like writing domain-specific puzzle pieces that adhere to the framework protocol. In this manner, the whole concept of programming changes. Instead of writing line after line of code that calls multiple API hierarchies, software will be developed by deriving classes from preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented graphic framework.

GLOSSARY

Area—a TGArea object. An area is a conglomerate geometry (or conglometry) that can be of any shape, as long as it can be defined by the finite set of basic geometries.

Basic Geometry—a "raw" geometry that is part of the graphic device's language. All conglometries must be made up of a number of basic geometries. For example, TGRect, TGEllipse, and TGPolygon are all basic geometries, while TGArea is a conglometry since it can be made up of numerous basic geometries.

CAG—Constructive Area Geometry (adapted for 2D from CSG, or Constructive Solid Geometry). The capability of performing boolean operations (add, subtract, intersect, and exclusive-or) on geometries, resulting in a new geometry.

Conglometry—a conglomerate geometry, which is a MAreaGeometry subclass. A single conglomerate geometry may be made up of any number of basic geometries. For example, it may consist of the intersection of a rectangle and an ellipse.

Geometry—an object that defines an area or path in space. Any given point in space is either on or off the path, or inside or outside the area.

GrafEdge—an object that represents part of the border of a geometry. For example, an ellipse is often modeled with two GrafEdges: one for the left side and one for the right side. Another example: a polygon with five sides can be modeled with five GrafEdges.

Transition—the act of crossing an edge in a geometry. For example, a straight line that crosses an ellipse makes a transition as it enters the ellipse and another as it exits.

INTRODUCTION

The TGArea class is a device-independent specification of an arbitrarily-shaped area. A TGArea object (henceforth referred to as an area) is defined by performing binary CAG (Constructive Area Geometry) operations on other area-defining geometries, such as rectangles, ellipses, and polygons. FIG. 2 is a graphical illustration of various arithmetic functions being applied to graphic objects. A square and a circle undergoing an add operation is shown at 200, a subtract operation at 210, an intersect operation at 220 and an exclusive-or operation at 230. A data structure representing a binary tree can be formed in the storage of a computer system to describe the content of any area. For example, FIG. 3 is an illustration of a rectangle plus an ellipse minus a polygon (Rectangle+Ellipse−Polygon). The associated binary tree structure is illustrated in FIG. 4. A mathematica description of the area is defined to be the rectangle plus the ellipse minus the polygon. When the graphic area in FIG. 3 is filled, only the highlighted outline 300 is filled. Similarly, when it is framed, the frame is drawn around the boundary of the filled area.

USAGE

View System

The most common use for the TGArea class is for defining the boundary of a graphic. For instance, a view (windowing) system uses areas to represent the shape and visible areas of its views. For example, in FIG. 5, an illustration of a variety of overlapping views in accordance with a preferred embodiment are provided. View A overlaps view B. The shape of view A is a round rectangle, and the shape of view B is a rectangle. The visible area of view A is simply its shape, since it is not covered by any other views. The visible area of view B, however, is formed by subtracting the shape of view A from its own shape, resulting in a rectangle minus a round rectangle. This type of geometric information can be recorded in a TGArea object. It is important to note that, just as with the Macintosh region, no area near the border of views A and B is either shared or orphaned. This implies that when these areas are drawn on the screen, no pixel is drawn twice or left untouched. It also means that the hit testing routines will never report ambiguous results.

APPLICATION DEVELOPERS

Application developers can treat areas the same as other geometries. In other words, areas can be filled, framed and hit-tested. However, unlike the other geometries, an area can be treated as an "amorphous" geometry; i.e., it can be transformed indiscriminately, without regard to the actual internal identity of the geometry. For instance, a perspective transform may be applied to a rectangular area, causing it to become non-rectangular; it probably transformed itself into a polygon internally. Conversely, a TGRect object cannot be transformed arbitrarily and still be a rectangle.

Figure 7:
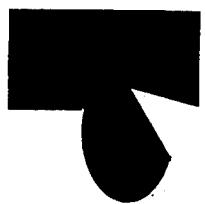
FIGS. 7 and 8 show two different ways the area appearing in FIG. 5 can be drawn in accordance with a preferred embodiment.
Figure 8:
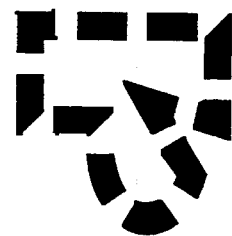

Construction of an area is simplified by a preferred embodiment. FIG. 5 is an example of a graphic area in accordance with a preferred embodiment, and FIG. 6 is an example of the C++ source code used to construct the graphic area illustrated in FIG. 5. The source code draws to a TGrafport. When a TGArea object is drawn, it is treated like any other geometry. It can be filled, framed, or both. The frame can be a hairline frame or a thick frame, and it can have complex properties, such as dashing and joint styles. The pictures in FIGS. 7 and 8 show two different ways the area appearing in FIG. 5 can be drawn. FIG. 7 is an illustration of a filled and framed graphic area with a hairline pen, while FIG. 8 is an illustration of a filled and framed area utilizing a dashed pen.

ARCHITECTURE

Figure 9:
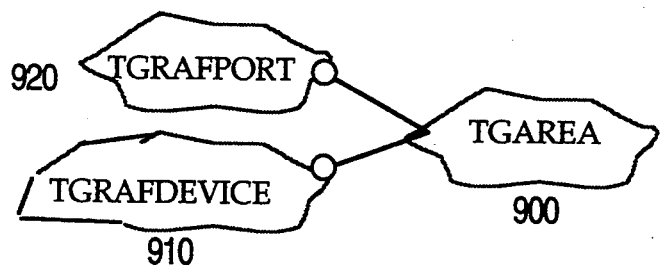
FIG. 9 a Booch diagram depicting the TGArea class 900 and its relationship to classes outside the architecture 910 & 920 in accordance with a preferred embodiment.

There are several groups of classes supporting the underlying architecture of the TGArea class. However, most applications can be facilitated with only the TGArea class. FIG. 9 is a Booch diagram depicting the TGArea class 900 and its relationship to classes outside the architecture 910 & 920. In the Booch diagram of FIG. 9, "clouds" depicted with dashed lines indicate classes or aggregations of classes (e.g. TGArea class 900). Arrows connecting classes are directed from subclass to superclass and indicate a hierarchy including the properties of encapsulation, inheritance and polymorphism as is well understood in object technology and graphic notations accepted in the art which are illustrative thereof. Double lines indicate use of the class in the implementation or interface. A circle at one end of a line segment indicates containment or use in the class with the circle on the end of the line segment. For a more complete description of this notation, reference is made to "Object Oriented Design" by Grady Booch, published by the Benjamin/Cummings Publishing Co., Copyright 1991. FIG. 9 indicates that the TGArea class 900 is used by the TGrafPort 920 and TGrafDevice 930 classes. For example, an area can be drawn on the screen using a TGrafPort object 920. The rendering is actually performed by the TGrafDevice object 910 that represents the screen.

The TGArea class 900 is described below. Only functions that are distinctly different are documented for each class. Inherited functions and functions that perform similar tasks are documented only in the parent class.

Area Class

Figure 10:
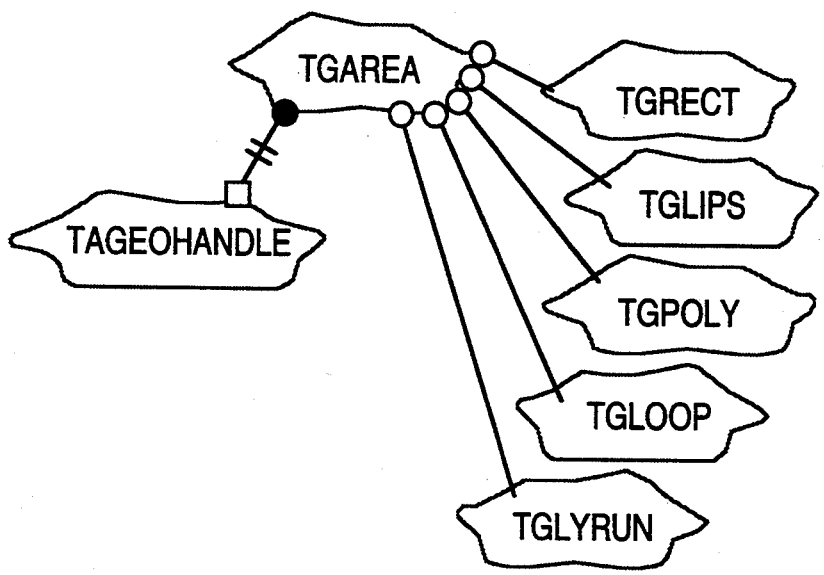
FIG. 10 is a detailed Booch diagram of the TGArea class in accordance with a preferred embodiment.

The TGArea class is the class most clients will use. It supports the operations required to construct an area and make inquiries of it, and it can be created from any of the area-defining basic geometries. FIG. 10 is a Booch diagram of the TGArea Class in accordance with a preferred embodiment.

TGArea

The TGArea class contains an internal conglometry object, and it routes all calls to this conglometry. In other words, it is a wrapper class for a conglometry. As discussed earlier, an area can be modeled using a binary tree of conglometries. The TGArea class can also perform some maintenance of the tree, such as:

Optimization of the tree. For example, if a large rectangle completely contains a smaller ellipse, the ellipse may be eliminated from the tree.

Simplification of the tree. For example, two abutting rectangles may be converted to a single rectangle or polygon.

A listing of the C++ code for the TGArea class is presented below.

```
class TGArea{
public:
TGArea ();
TGArea (const TGRect& g);
TGArea (const TGEllipse& g);
TGArea (const TGPolygon& g);
TGArea (const TGLoop& g);
TGArea (const TGGlyphRun& g);
TGArea (const TGArea& g);
TGArea (const TAreaGeometryHandle& g);
virtual ~TGArea ();
```

A TGArea can be constructed from any of the area-defining basic geometries. A TGArea object can also be constructed from a TAreaGeometryHandle object (i.e., any conglometry).

```
void Add (const TGArea&);
const TGArea& operator+=(const TGArea&);
```

These functions perform the addition (or union) of two areas. They add the specified area to this area.

```
void Subtract (const TGArea&);
const TGArea& operator-=(const TGArea&);
```

These functions perform the subtraction (or difference) of two areas. They subtract the specified area from this area.

```
void Intersect (const TGArea&);
const TGArea& operator*=(const TGArea&);
```

The functions listed directly above perform intersection of two areas. They intersect the specified area with this area.

```
void ExclusiveOr (const TGArea&);
const TGArea& operator=(const TGArea&);
```

The functions listed directly above perform the exclusive-or operation on two areas. They exclusive-or the specified area with this area.

```
void TransformBy (const TGrafMatrix& matrix);
```

This functions transforms the area using the specified matrix.

```
void Extract (
TGrafExtractor& extractor,
TCAGNode* node,
const TMatrixState& matrixState=TGlobalMatrix-
    State::GetIdentity()) const;
```

The functions listed directly above perform the extraction function, which expresses the area's geometric structure in terms of the basic geometries (TGRect, TGEllipse, etc.). These functions are performed by making the appropriate calls to the specified TGrafExtractor object. The CAG node is passed in is the parent node of the area. In other words, any CAG node created by the area should have this node as its parent node. This allows the CAG tree to be built. The TMatrixState object specifies the coordinate system in which the area is to exist for this call. It may be passed directly to the TGrafExtractor object, or a new object based on this object may be passed to the TGrafExtractor.

```
Boolean IsEmpty () const;
```

This function returns TRUE if the area is empty (i.e., it geometrically contains no area).

```
void SetToEmpty ();
```

The functions listed directly above initialize the area to the empty area. It is equivalent to calling the default constructor, or calling GetEmptyArea.

```
Boolean IsRectangular () const;
```

The functions listed directly above returns TRUE if the area is a single unrotated rectangle.

```
Boolean IsRectilinear () const;
```

The functions listed directly above returns TRUE if the area is made up of only horizontal and vertical edges. For example, an area made up of multiple unrotated rectangles is rectilinear.

```
Boolean IsSingular () const;
```

The functions listed directly above returns TRUE if the area consists of exactly one basic geometry. For example, an area made up of a single polygon is singular, while an area made up of a rectangle minus a circle is not.

```
TGRect GetBotmds () const;
```

The functions listed directly above returns a loose bounding rectangle that completely encloses the area.

```
Boolean Contains (const TGPoint& point) const;
Boolean Contains (const TGRect& rect) const;
Boolean Intersects (const TGRect& rect) const;
```

These functions perform simple hit-testing operations on the area.

```
TPseudoTimeStamp GetTimeStamp () const;
```

The functions listed directly above returns the area's time stamp, which is automatically updated whenever the area is modified. const TGArea& operator=(const TGArea& area);

The functions listed directly above is the assignment operator.

```
Boolean operator==(const TGArea& area);
Boolean operator!=(const TGArea& area);
```

These are the equality operators.

```
const TGArea& operator>>=(TStream& stream)
    const;
const TGArea& operator<<=(TStream& stream);
```

These are the streaming operators.

```
static const TGArea& GetEmptyArea ();
static const TGArea& GetInfiniteArea ();
```

The functions listed directly above return constant references to empty and infinitely large areas, respectively.
};

```
TGArea operator+(const TGArea& area0, const
    TGArea& area1);
```

This function performs the addition (or union) of two areas. It adds the specified areas and returns the resulting area.

```
TGArea operator-(const TGArea& area0, const
    TGArea& area1);
```

This function performs the subtraction (or difference) of two areas. It subtracts the area1 from area0 and returns the resulting area.

```
TGArea operator*(const TGArea& area0, const
    TGArea& area1);
```

This function performs intersection of two areas. It intersects the specified areas and returns the resulting area.

```
TGArea operator (const TGArea& area0, const
    TGArea& area1);
```

The functions listed directly above performs the exclusive-or operation for two areas. It exclusive-ors the specified areas and returns the resulting area.

Detailed Architecture

Figure 11:
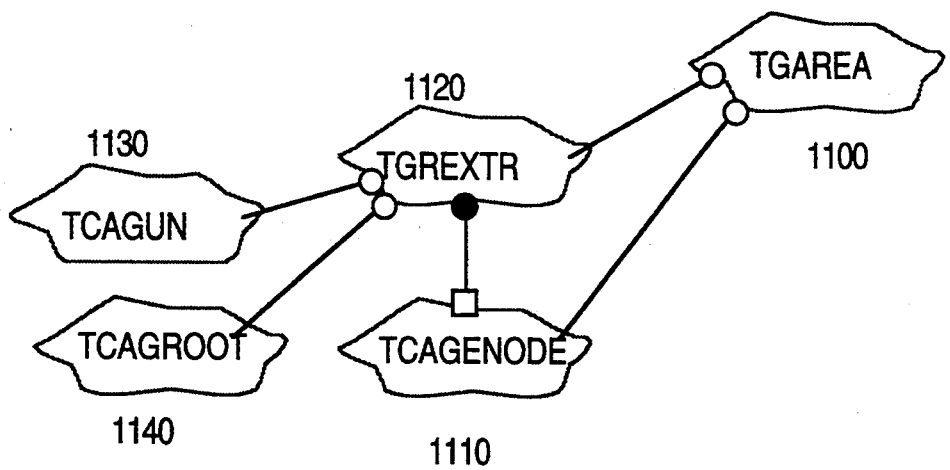
FIG. 11 is a Booch diagram of the TGArea class in accordance with a preferred embodiment.

This section describes the classes that may be needed by advanced programmers. Advanced programmers include grafDevice writers and other programmers who need to "iterate" through the geometries contained in an area. FIG. 11 is a Booch diagram of these classes in accordance with a preferred embodiment. The TGArea class 1000 is capable of expressing its internal geometry to a TGrafExtractor object 1020. TCAGNode subclasses 1010, 1030 and 1040 are used to express the wrap count behavior of each individual basic geometry contained in the area. The classes listed above and their subclasses are documented below. Only functions that are distinctly different are documented for each class; inherited functions and functions that perform similar tasks are usually documented only in the parent class.

CAG Classes

Figure 12:
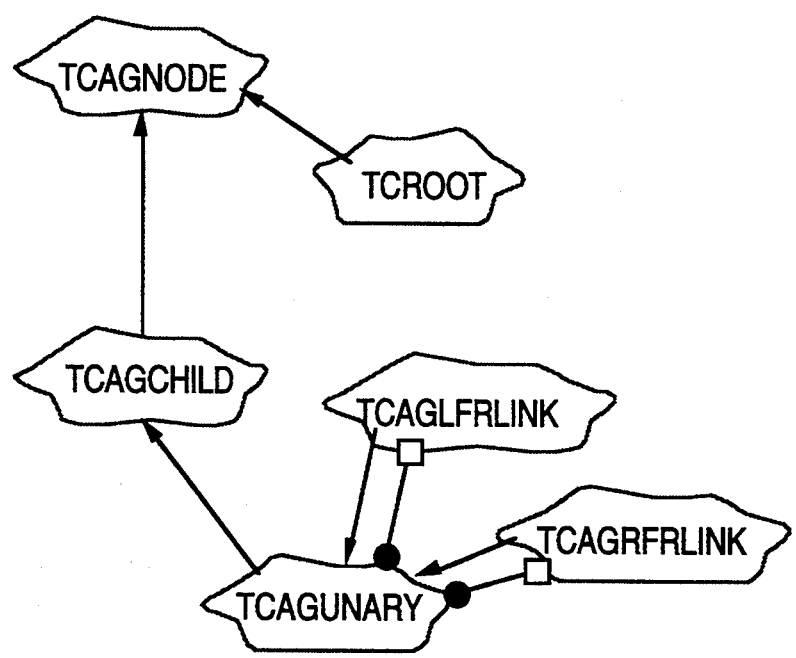
FIG. 12 illustrates some of the CAG classes in accordance with a preferred embodiment.

In order to be rendered, hit-tested, etc., the conglometries must provide a method of inside/outside determination; i.e., the rendering (or hit-testing, etc.) code must be able to determine whether or not a point is inside or outside the conglometry. This is accomplished by the CAG classes. FIG. 12 illustrates some of the CAG classes. Before a conglometry is rendered, a binary tree of TCAGNode subclasses is constructed that mirrors the binary tree of the conglometry. Every leaf node in a conglometry must have a reference to one of the leaf nodes of this tree. When an edge in the conglometry is encountered, the appropriate CAG node is informed that a transition has occurred.

With reference to the example presented in FIGS. 3, 4, 5 and 6, consider the following. This conglometry consists of a rectangle plus an ellipse minus a polygon (all basic geometries) as illustrated in FIG. 3. Its binary tree is shown in FIG. 4. This binary tree represents both the conglometry's internal structure and the structure of the CAG tree that is constructed before it is rendered.

Figure 13:
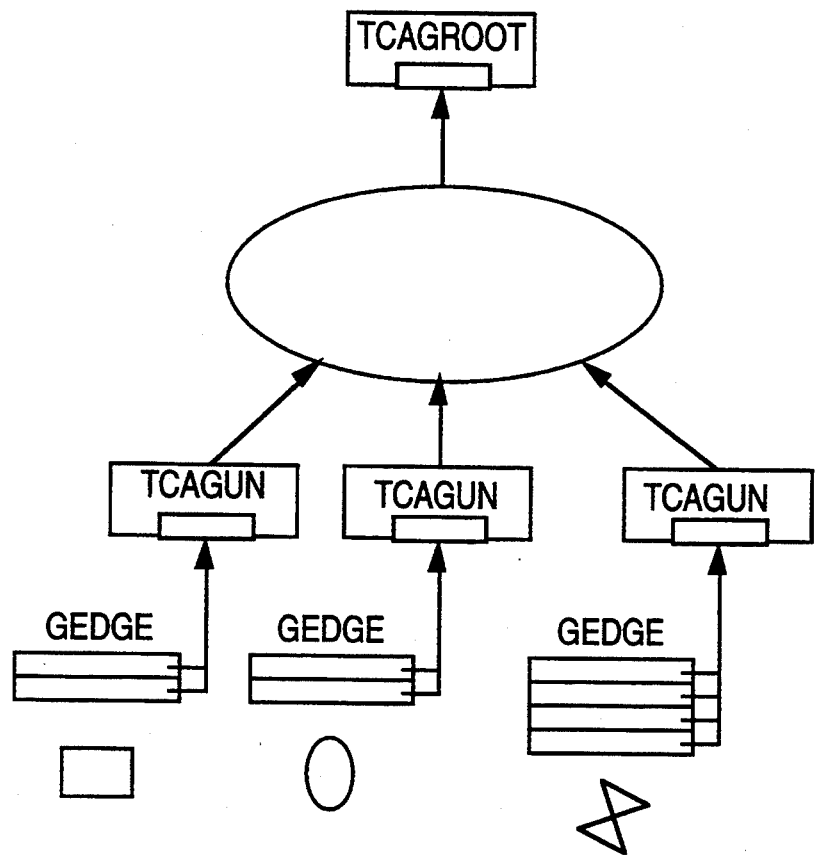
FIG. 13 is an illustration of a CAG tree in accordance with a preferred embodiment.

To the advanced programmer, however, the exact structure of the tree is unimportant. it is automatically set up by the TGArea class. FIG. 13 is an illustration of a CAG tree.

Figure 14:
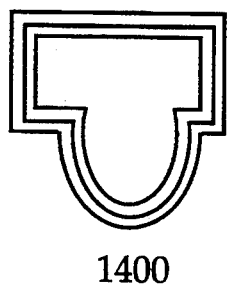
FIG. 14 illustrates a conglometry in accordance with a preferred embodiment.
Figure 14:
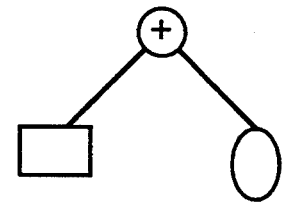
Figure 15:
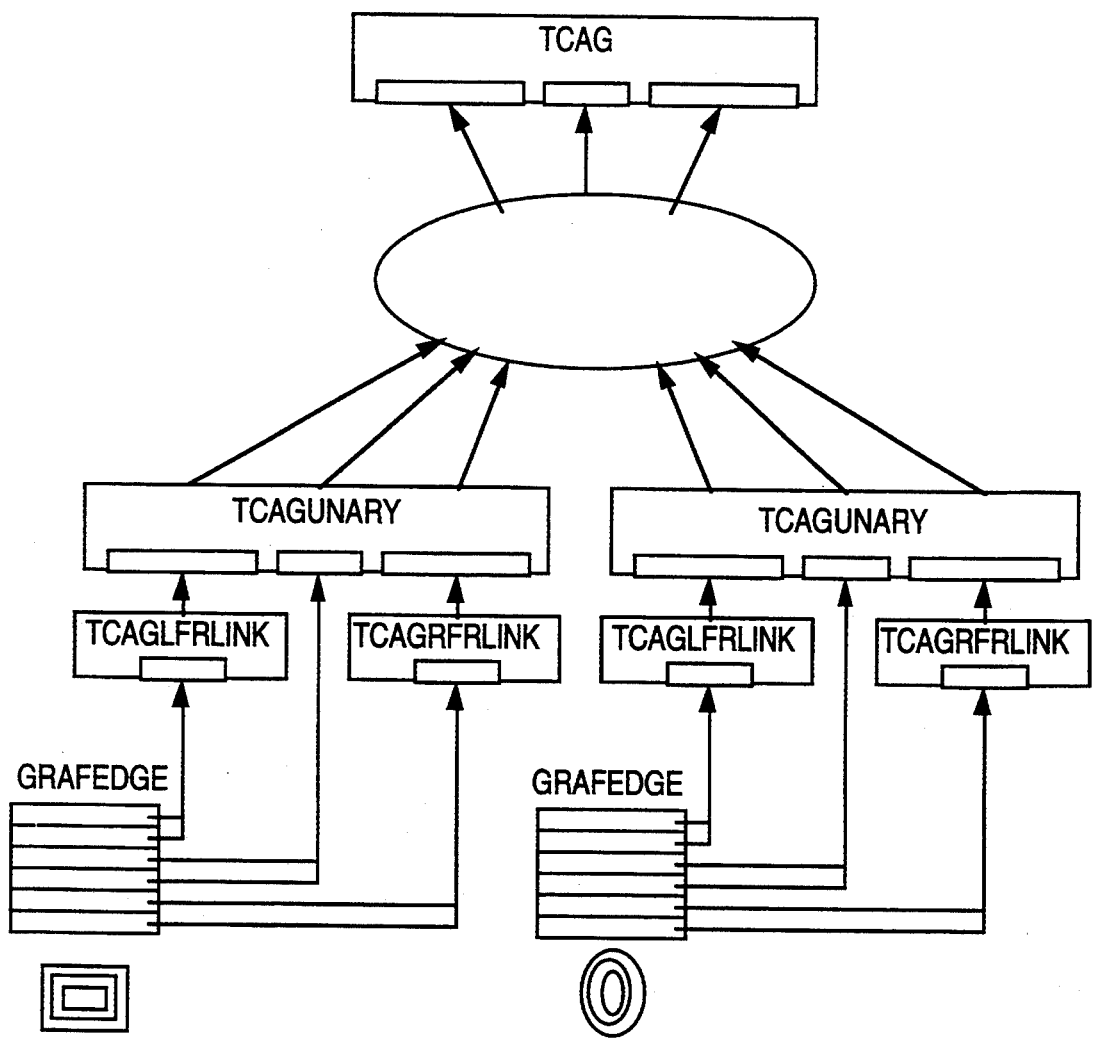
FIG. 15 details the important parts of a CAG tree in accordance with a preferred embodiment.

The edges in each basic geometry all point to their respective CAG node leaves in the tree. Whenever an edge makes a transition, it notifies its CAG node, which causes the tree to recalculate the resultant value at the top of the tree. This value is used to determine whether or not the current point is inside or outside the conglometry. For example, consider a scan-conversion process. Each row of pixels represents a horizontal path that crosses the conglometry at a different y value. Each horizontal path causes transitions to occur in each of the edges it crosses from left to right. Each time a transition is made, the scan-converter queries the root of the CAG tree to determine whether or not the current position is within the entire conglometry to determine which pixels to turn on. The situation gets more complicated when a conglometry is framed. FIG. 14 illustrates a conglometry shown consisting of a rectangle plus an ellipse 1400. Its binary tree is presented at 1410. FIG. 15 details the important parts of the CAG tree.

Figure 16:
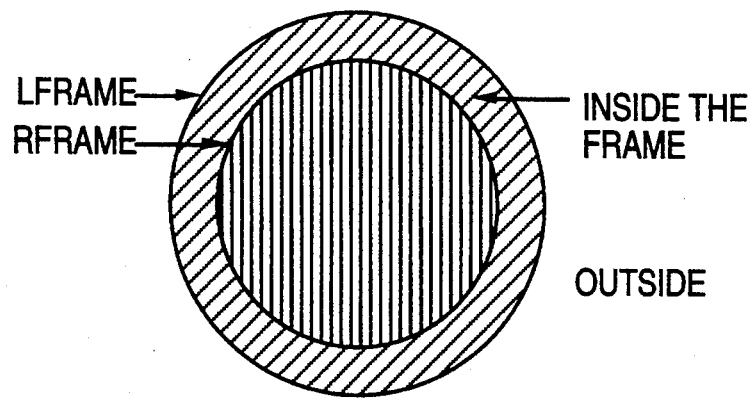
FIG. 16 illustrates some of the terms that are used in accordance with a preferred embodiment.

A conglometry that is framed is defined by three types of edges: fill, left frame, and right frame (the labels "left" and "right" were chosen arbitrarily to distinguish between the two frame edges; no ordering is implied or intended). Each CAG node has three transition functions, one for each of the three types of edges. All transition values passed to each CAG node (except leaf nodes) are assumed to exhibit even-odd behavior. In other words, the nodes must treat their incoming values as though they are even-odd values, and they must produce new values that have even-odd behavior. In the following sections, some of the language concerning the fill and frame areas of a geometry may be vague. FIG. 16 illustrates some of the terms that are used in accordance with a preferred embodiment.

TCAGNode

TCAGNode is an abstract class that provides the shared protocol of all the CAG classes.

```
class TCAGNode{
public:
virtual ~TCAGNode ();
typedef WrapCount long;
```

A "wrap count" is a cumulative value that represents the state of a geometry at a particular point. It is necessary to keep wrap counts to determine whether or not a path is entering or exiting a geometry when it crosses an edge in the geometry.

```
virtual void Transition (WrapCount fill)=0;
virtual void TransitionLeftFrame (WrapCount leftFrame)=0;
virtual void TransitionRightFrame (WrapCount rightFrame)=0;
```

Every TCAGNode subclass has three transition functions, which are called by a child node when transitions are made in the fill and frame states of the child. For instance, when an edge transition occurs, the edge calls one of its parent's transition function.

```
protected:
TCAGNode ();
TCAGNode (const TCAGNode&);
```

The code appearing directly above is the empty and copy constructors. They are protected because this is an abstract class.

```
TCAGNode& operator= (const TCAGNode&);
```

The code appearing directly above is the assignment operator. It is protected because this is an abstract class.

```
};
```

TCAGChild

The code appearing directly above is the class providing the shared protocol of all CAG nodes that have parent nodes. Parent nodes are one level higher in the binary tree. They are referenced by their children.

```
class TCAGChild: public TCAGNode{
public:
virtual ~TCAGChild ();
protected:
TCAGChild (TCAGNode* parent);
```

The constructor appearing directly above takes a pointer to a parent CAG node (a node one level higher in the tree). It is protected because this is an abstract class.

56 ;

TCAGUnary

The code appearing directly above defines a class that provides the shared protocol of all child CAG nodes whose values are controlled by a single source.

```
class TCAGUnary: public TCAGChild{
public:
virtual ~TCAGUnary ();
TCAGLeftFrameLink* GetLeftFrameLink ();
TCAGRightFrameLink* GetRightFrameLink ();
```

The two functions appearing directly above return pointers to the TCAGLeftFrameLink and TCAGRightFrameLink objects. They are normally called to link the left and right frame transition functions. Reference the TCAGLeftFrameLink and TCAGRightFrameLink classes below.

```
protected:
TCAGUnary (TCAGNode* parent);
```

The constructor appearing above obtains a pointer to a parent CAG node. It is protected because this is an abstract class.

Figure 17:
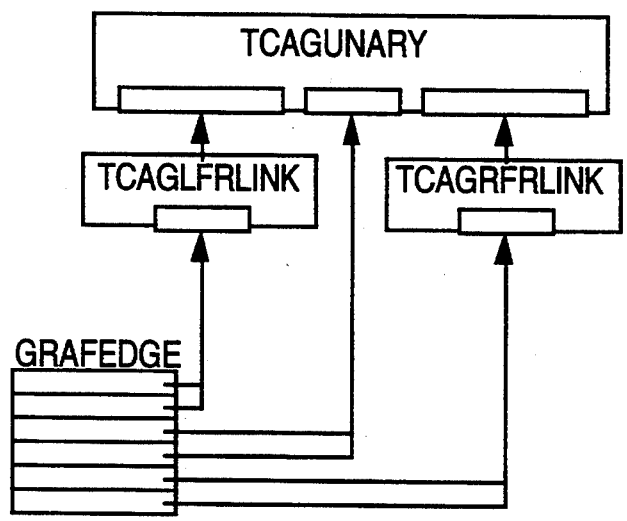
FIG. 17 illustrates the linkages between various frames and their parents in accordance with a preferred embodiment.

TCAGLeftFrameLink and TCAGRightFrameLink are used when a geometry is framed. When a transition occurs for a particular GrafEdge, one of the transition functions of its parent CAG node must be called. However, if the GrafEdge corresponds to the left frame or the right frame of the geometry, one of the frame transition functions must be called instead of the fill transition function. Since the GrafEdge itself has no knowledge of which transition function to call, an object must be used that routes a fill transition to a left or right frame transition. FIG. 17 illustrates the linkages between various frames and their parents in accordance with a preferred embodiment. Without the classes TCAGLeftFrameLink and TCAGRightFrameLink, the link between the frame GrafEdges and their parents would be implemented in a different way (e.g., with function pointers).

```
class TCAGLeftFrameLink: public TCAGUnary{
public:
TCAGLeftFrameLink (TCAGNode* parent);
virtual ~TCAGLeftFrameLink ();
virtual void Transition (WrapCount fill);
```

The fill transition function simply calls the TransitionLeftFrame function of its parent CAG node.

Extractor Class

Figure 18:
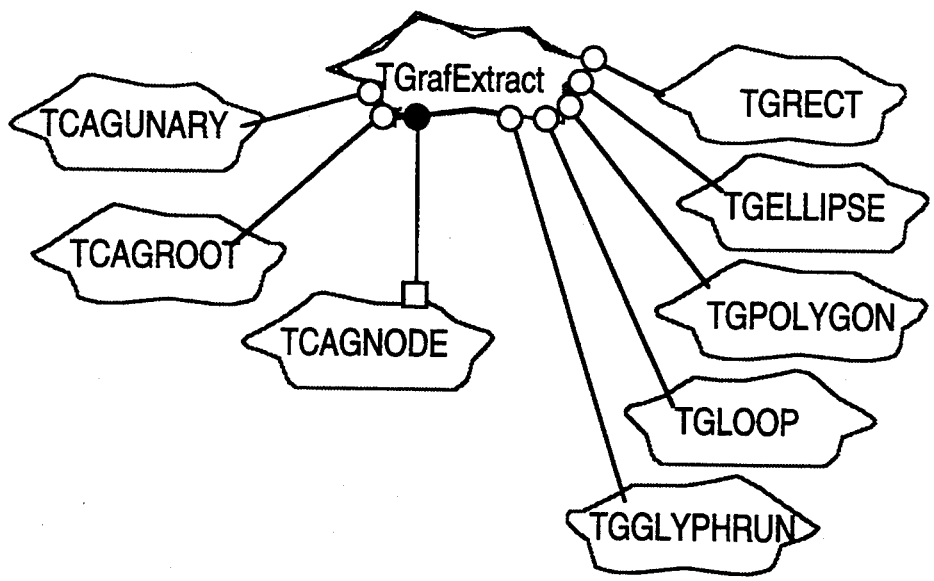
FIG. 18 is a Booch diagram of an extractor class in accordance with a preferred embodiment.

The conglometry classes listed above require a means of expressing themselves as a collection of the basic geometries (TGRect, TGEllipse, etc.). This is accomplished by the extractor class shown in FIG. 18. The only way a TGArea object can be "iterated" over is by the use of the TGrafExtractor class. Subclasses provide behavior that processes the basic geometries in conjunction with the CAG nodes in order to produce a desired result. For example, the frame buffer graphics device uses several extractor subclasses to discover the contents of an area in order to draw it.

TGrafExtractor

The TGrafExtractor class allows conglometries to "dump" their contents into it. It has a call for each basic geometry for which support is required by every subclass (especially graphics devices). When asked to extract, a conglometry is given a reference to an extractor, to which it makes calls in order to express its internal geometric structure.

```
class TGrafExtractor{
public:
virtual ~TGrafExtractor ();
virtual void ExtractRect (
  const TGRect&,
  TCAGUnary*,
  const TMatrixState& matrixState=TGlobalMa-
    trixState::GetIdentity())=0;
virtual void ExtractEllipse (
  const TGEllipse&,
  TCAGUnary*,
  const TMatrixState& matrixState=TGlobalMa-
    trixState::GetIdentity())=0;
virtual void ExtractPolygon (
  const TGPolygon&,
  TCAGUnary*,
  const TMatrixState& matrixState=TGlobalMa-
    trixState::GetIdentity())=0; virtual void Extract-
Loop (
  const TGLoop&,
  TCAGUnary*,
  const TMatrixState& matrixState=TGlobalMa-
    trixState::GetIdentity())=0; virtual void Extract-
GlyphRun (
  const TGGlyphRun&,
  TCAGUnary*,
  const TMatrixState& matrixState=TGlobalMa-
    trixState::GetIdentity())=0; virtual void Extract-
Line (
  const TGLine&,
  TCAGUnary*,
  const TMatrixState& matrixState=TGlobalMa-
    trixState::GetIdentity())=0; virtual void Extract-
Polyline (
  const TGPolyline&,
  TCAGUnary*,
  const TMatrixState& matrixState=TGlobalMa-
    trixState::GetIdentity())=0; virtual void Extract-
Curve (
  const TGCurve&,
  TCAGUnary*,
  const TMatrixState& matrixState=TGlobalMa-
    trixState::GetIdentity())=0;
```

Any of the ExtractX functions can be called by the Extract function of a conglometry to express its geometric contents. For example, a conglometry that consists of a rectangle plus an ellipse will make calls to ExtractRect and ExtractEllipse. The TCAGUnary object is passed into each function allows the conglometry to express the wrap count behavior applied to its geometry (i.e., even-odd or winding number). It creates an object of the appropriate TCAGUnary subclass. This object is subsequently referenced by any lower level geometries (e.g., GrafEdges) that are created for the geometry. This is how the leaves of the CAG node tree are connected to the lower level geometry.

The TMatrixState object passed into each function express the coordinate system that the geometry is in. After the CAG nodes are collected for a conglometry, the resulting CAG node tree can be used to determine whether or not a point is inside or outside the entire conglometry. The root of the tree is passed into the Render function discussed below.

Internal Architecture

Figure 19:
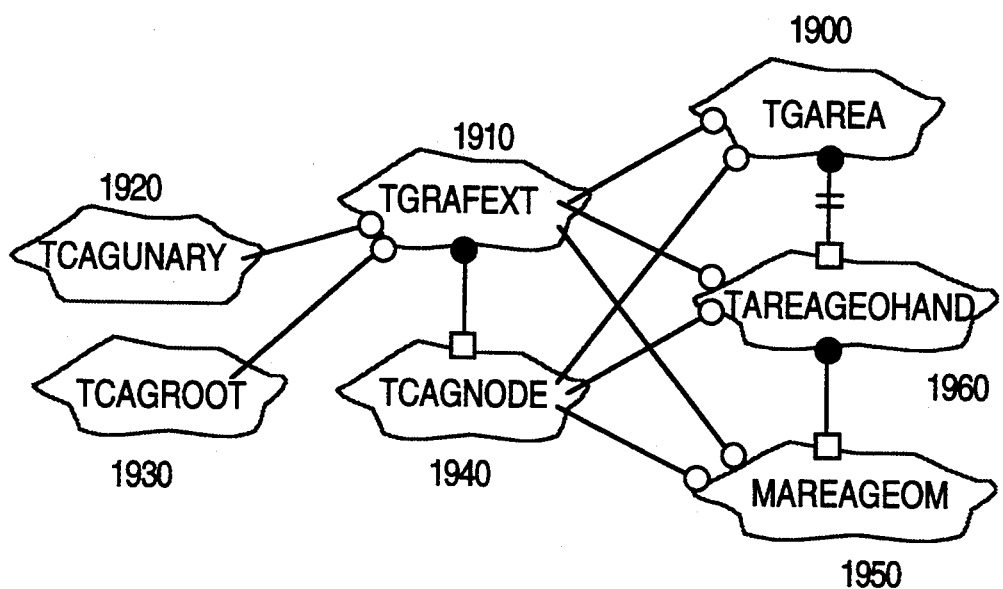
FIG. 19 presents a Booch diagram of classes in accordance with a preferred embodiment.

The architecture of the classes used to support the TGArea architecture is presented below. FIG. 19 presents a Booch diagram of the classes. The TGArea class 1900 contains a single TAreaGeometryHandle object 1960, which is a surrogate for an MAreaGeometry subclass 1950 (a conglometry). In other words, the TGArea class 1900 is a wrapper for the TAreaGeometryHandle class 1960, and the TAreaGeometryHandle class 1960 is a surrogate for the MAreaGeometry class 1950. TGArea 1900, TAreaGeometryHandle 1960 and MAreaGeometry 1950 classes all express their internal geometry to a TGrafExtractor object 1910. TCAGNode subclasses 1940 are used to express the wrap count behavior of each individual MAreaGeometry object 1950. Clients who need to provide a new, custom conglometry will subclass MAreaGeometry 1950. To take advantage of the reference counting of the MAreaGeometry class 1950, they must wrap it up in a TAreaGeometryHandle object 1960. The classes discussed above and their subclasses are detailed below.

CAG Classes

Figure 20:
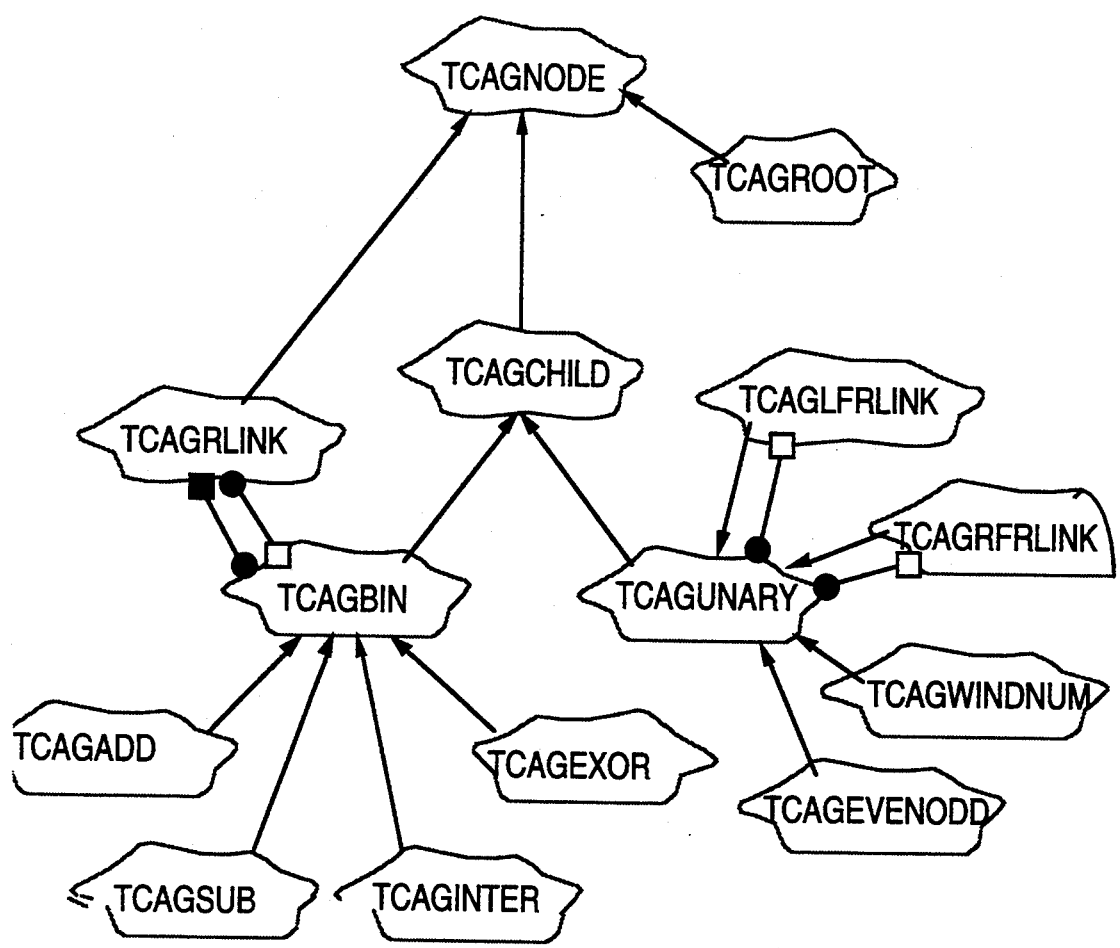
FIG. 20 is a Booch diagram of CAG classes in accordance with a preferred embodiment.

To be rendered, hit-tested, etc., the conglometries must provide a method of inside/outside determination. For example, the rendering (or hit-testing, etc.) code must determine whether a point is inside or outside the conglometry. This processing is accomplished by the CAG classes presented in FIG. 20. Before a conglometry is rendered, a binary tree of TCAGNode subclasses is constructed that mirrors the binary tree of the conglometry as illustrated in FIG. 20. Every edge in a conglometry must have a reference to one of the leaf nodes of this tree. When an edge in the conglometry is encountered, the appropriate CAG node is informed that a transition has occurred. With reference to the example presented in FIGS. 3, 4, 5 and 6, consider the following. This conglometry consists of a rectangle plus an ellipse minus a polygon (all basic geometries) as illustrated in FIG. 3. Its binary tree is shown in FIG. 4. This binary tree represents both the conglometry's internal structure and the structure of the CAG tree that is constructed before it is rendered.

Figure 21:
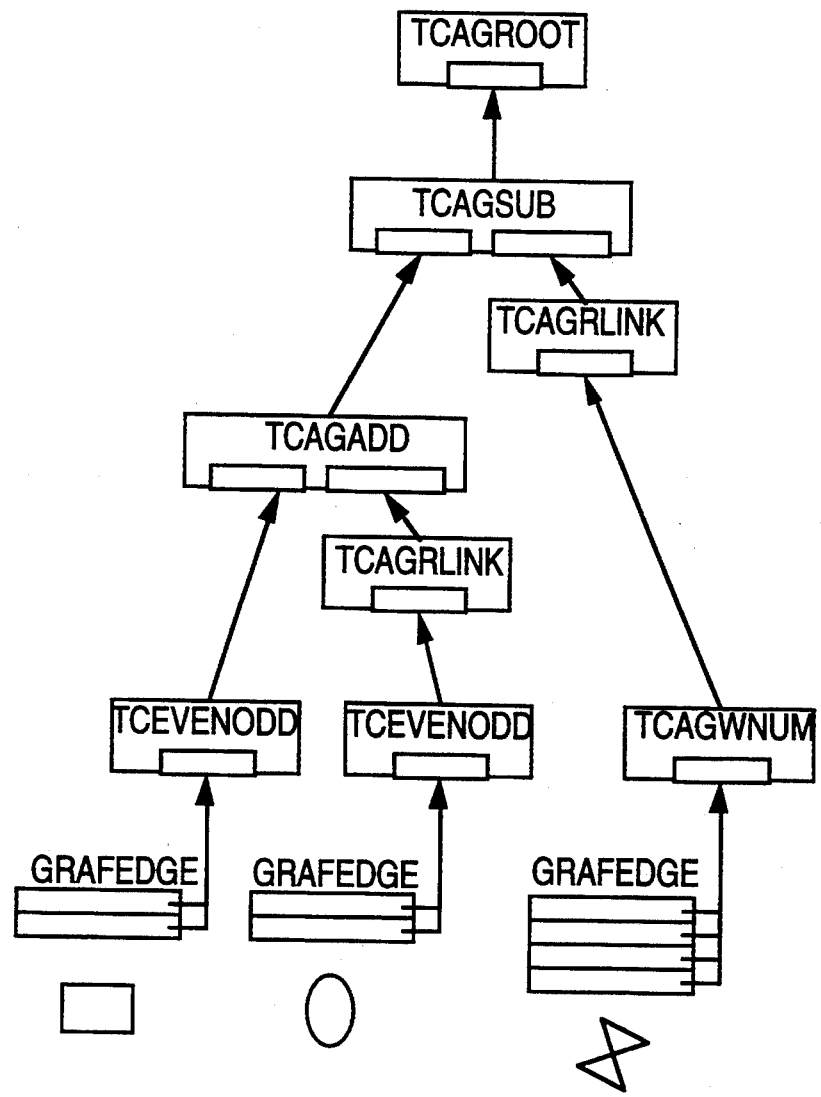
FIG. 21 is a detailed CAG tree illustrating the internal structure of the CAG tree in accordance with a preferred embodiment.

FIG. 21 is a detailed CAG tree illustrating the internal structure of the CAG tree. The edges in each basic geometry all point to their respective CAG node leaves in the tree. Whenever an edge makes a transition, it notifies its CAG node, which causes the tree to recalculate the resultant value at the top of the tree. This value is used to determine whether or not the current point is inside or outside of the conglometry.

For example, consider a scan-conversion process. Each row of pixels represents a horizontal path that crosses the conglometry at a different y value. Each horizontal path causes transitions to occur in each of the edges it crosses from left to right. Each time a transition is made, the scan-converter queries the root of the CAG tree to determine whether or not the current position is within the entire conglometry to determine which pixels to turn on.

Figure 22:
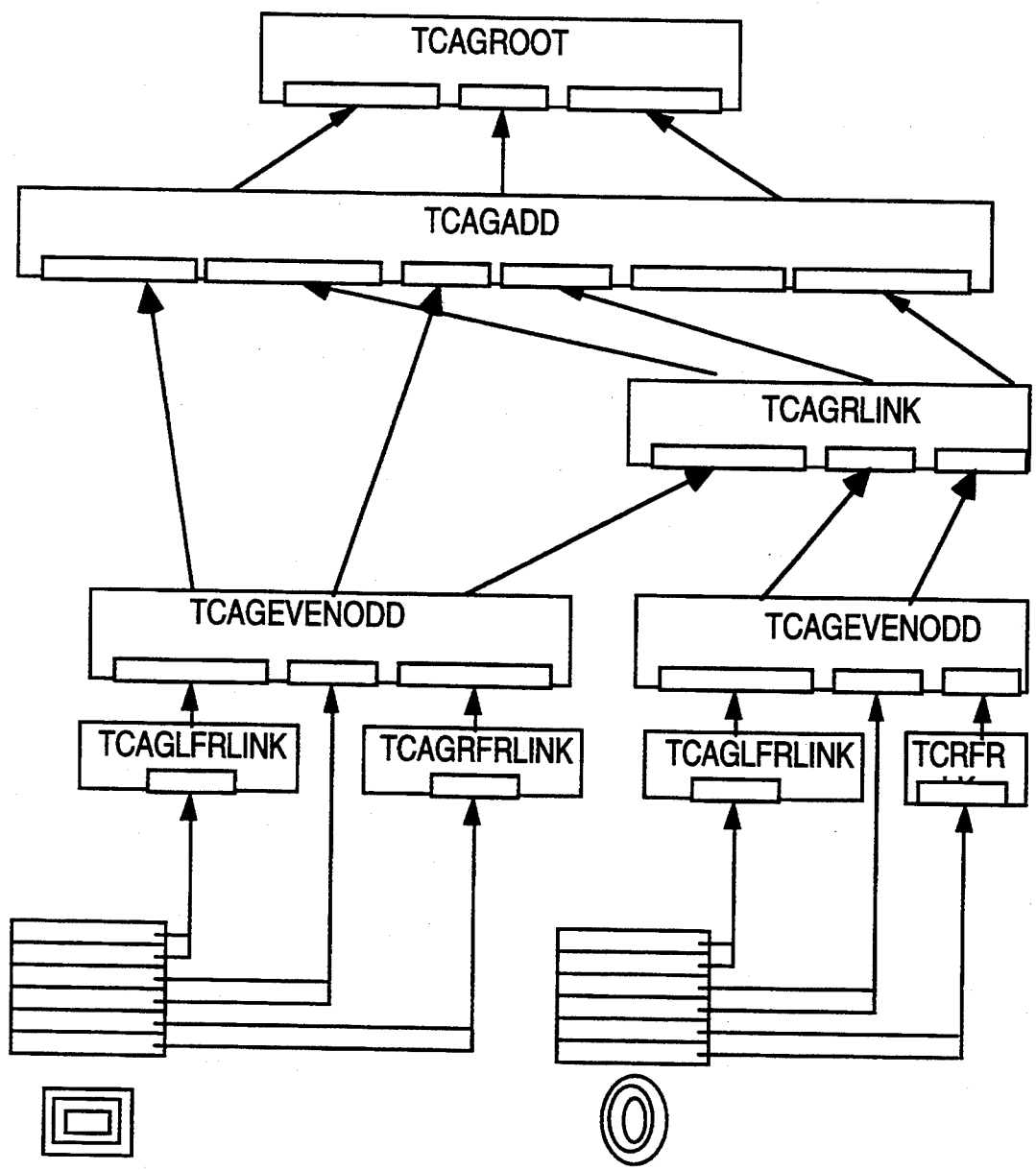
FIG. 22 is tree structure of the internal structure of the CAG tree in accordance with a preferred embodiment.

The situation gets more complicated when a conglometry is framed as shown in FIG. 14. The CAG tree for the internal structure is presented in FIG. 22. A conglometry that is framed is defined by three types of edges: fill, left frame, and right frame (the labels "left" and "right" were chosen arbitrarily to distinguish between the two frame edges; no ordering is implied). Each CAG node has three transition functions, one for each of the three types of edges. All transition values passed to each CAG node (except leaf nodes) are assumed to exhibit even-odd behavior. For example, the TCAGAdd node treats its incoming values as though they are even-odd values, and it must produce new values that have even-odd behavior. At this time, evaluation of the CAG tree is done recursively: a transition call to CAG node may result in a transition call to its parent node. It may be beneficial to explore a non-recursive algorithm that walks the tree algorithmically to improve performance and to minimize stack usage. However, this is a low priority because:

In practice, most areas are probably not "deep" enough to cause serious problems; and The stack usage of a single Transition call is very low.

Figure 23:
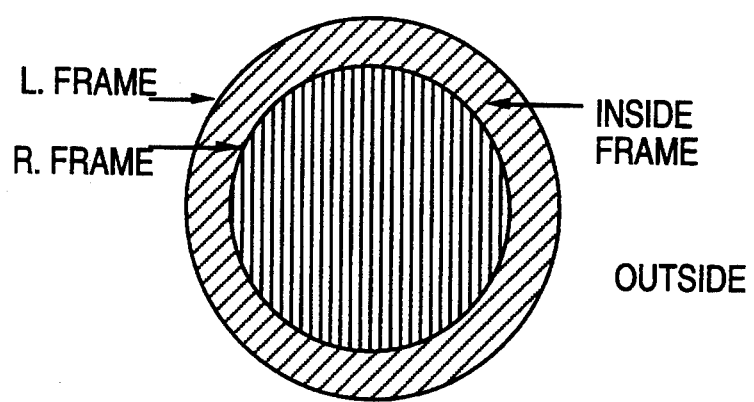
FIG. 23 is a diagram illustrating some of the terms that are used in accordance with preferred embodiment.

In the following sections, some of the language concerning the fill and frame areas of a geometry may be vague. FIG. 23 is a diagram illustrating some of the terms that are used in accordance with a preferred embodiment.

TCAGNode

TCAGNode is an abstract class that provides the shared protocol of all the CAG classes.
  class TCAGNode{
  public:
  virtual ~TCAGNode ();
  typedef WrapCount long;
A "wrap count" is a cumulative value that represents the state of a geometry at a particular point. It is necessary to keep wrap counts to determine whether or not a path is entering or exiting a geometry when it crosses an edge in the geometry.
  virtual void Transition (WrapCount fill)=0;
  virtual void TransitionLeftFrame (WrapCount leftFrame)=0;
  virtual void TransitionRightFrame (WrapCount rightFrame)=0;
Every TCAGNode subclass has three transition functions, which are called by a child node when transitions are made in the fill and frame states of the child. For instance, when an edge transition occurs, the edge calls one of its parent's transition functions.

Conglomerate Geometry Classes

Figure 24:
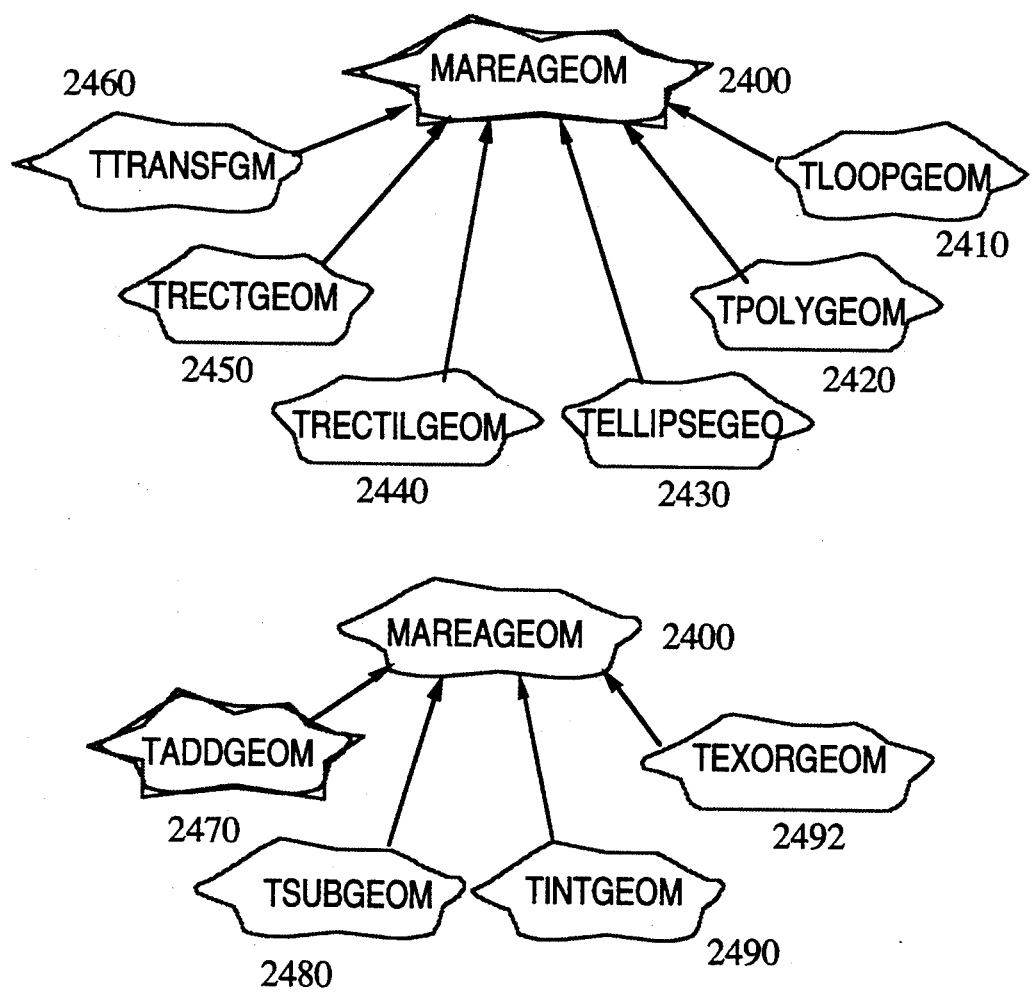
FIG. 24 illustrates a conglometry class hierarchy in accordance with a preferred embodiment.

A polymorphic set of conglomerate geometry (conglometry) classes is needed in order to store a binary tree of conglometries (unlike the basic geometries, which share no lineage). FIG. 24 illustrates a conglometry class hierarchy in accordance with a preferred embodiment.

MAreaGeometry 2400

The MAreaGeometry 2400 is the class that provides the protocol that is shared by all conglometries. This includes extraction, transformation, hit-testing, comparison, and various queries (rectangular, rectilinear, empty, and singular). It also includes MCollectible and MReferenceCounted protocol. Extraction is the process by which an MAreaGeometry subclass expresses its internal geometric structure.
  class MAreaGeometry: public MCollectible, public MReferenceCounted{
  public:
  virtual ~MAreaGeometry ();
  virtual void Extract (
    TGrafExtractor& extractor,
    TCAGNode* node,
    const TMatrixState& matrixState=TGlobalMatrixState::GetIdentity()) const=0;
The code appearing directly above is the extraction function, which expresses the conglometry's geometric structure in terms of the basic geometries (TGRect, TGEllipse, etc.). It does this by making the appropriate calls to the specified TGrafExtractor object. For example, this function is called when a MAreaGeometry subclass is drawn to the frame buffer device. The CAG node passed in is the parent node of the conglometry. In other words, any CAG node created by the conglometry should have this node as its parent node. This allows the CAG tree to be built. The TMatrixState object specifies the coordinate system in which the geometry is to exist for this call. It may be passed directly to the TGrafExtractor object, or a new one based on this one may be passed to the TGrafExtractor.
  virtual MAreaGeometry* CloneAndTransform (const TGrafMatrix& m) const=0;
This function copies the object, transforms it by the specified matrix, and returns a pointer to the new object. The new object may or may not be of the same concrete type. For instance, a shearing operation performed on a TRectGeometry object 2450 returns a TPolygonGeometry object, since the result is not a rectangle any more.
  virtual MAreaGeometry* CloneAndAdd (const MAreaGeometry&) const=0;
  virtual MAreaGeometry* CloneAndSubtract (const MAreaGeometry&) const=0;
  virtual MAreaGeometry* CloneAndIntersect (const MAreaGeometry&) const=0;
  virtual MAreaGeometry* CloneAndExclusiveOr (const MAreaGeometry&) const=0;
The functions appearing in the code directly above are responsible for copying the object, performing the corresponding CAG operation, and returning a pointer to the new object. The new object may or may not be of the same concrete type. Four instance, adding a TPolygonGeometry object to a TEllipseGeometry object returns a TAddGeometry object.

Geometry Surrogate Class

A geometry surrogate class is a wrapper class that references a conglometry (an MAreaGeometry subclass). It allows sharing of the geometric data; i.e., multiple surrogates may reference the same MAreaGeometry subclass 2400. This is desirable because it avoids unnecessary copying of the geometric data. The surrogate (or handle), TAreaGeometryHandle, is used for sharing read-only geometric data.

Figure 25:
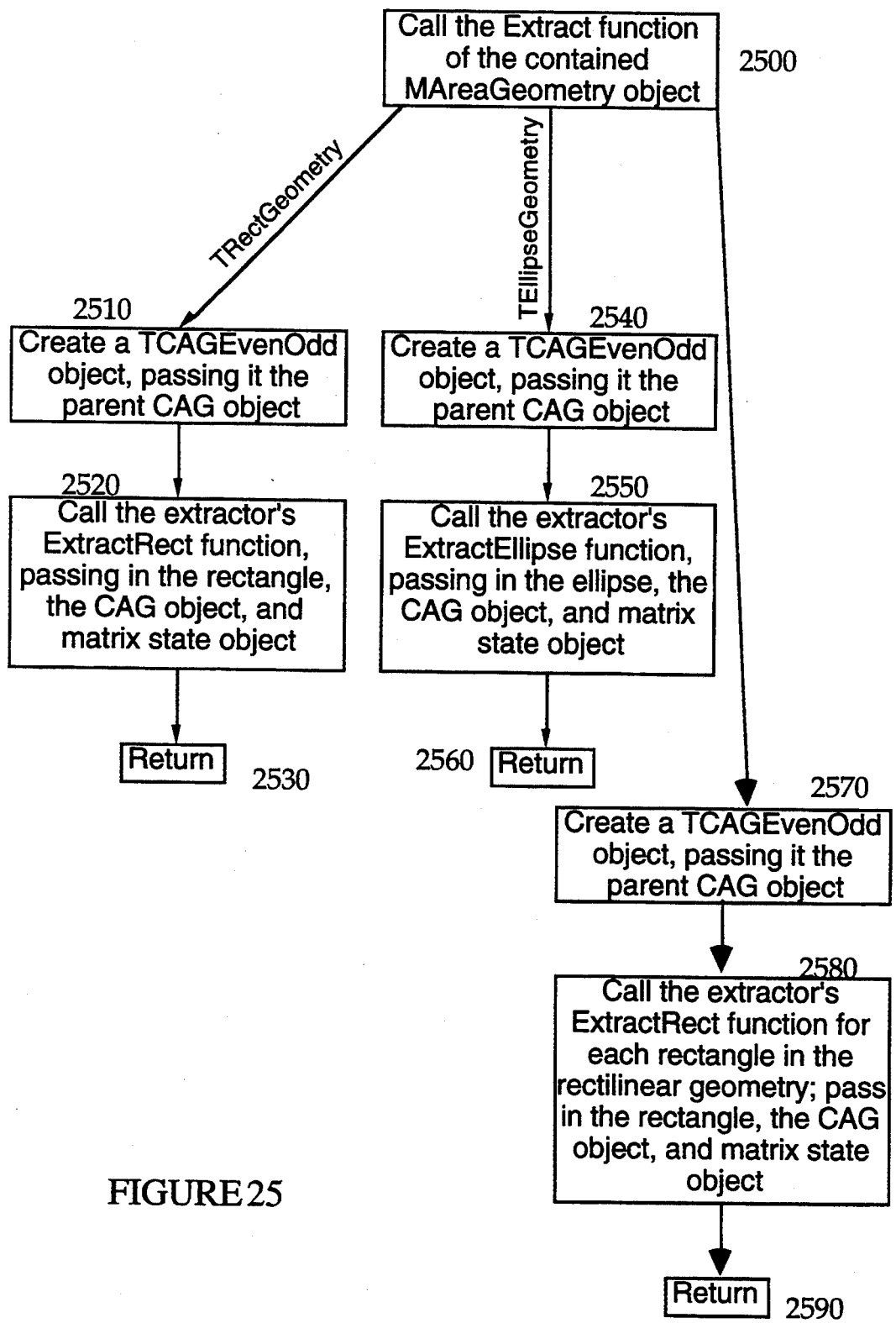
FIG. 25 is a flowchart setting forth the detailed logic in accordance with a preferred embodiment.

FIG. 25 is a flowchart setting forth the detailed logic in accordance with a preferred embodiment. Processing commences at function block 2500 where an extract function is called based on the particular geometry that is to be clipped. In all cases, an even odd object is created at function block 2510, 2540 or 2570 and control is passed to 2520 if a rectangle is to be clipped, 2550 if an ellipse is to be processed, or 2580 if a rectilinear geometry is to be processed. Then control is returned via 2530, 2560 or 2590.

Figure 26:
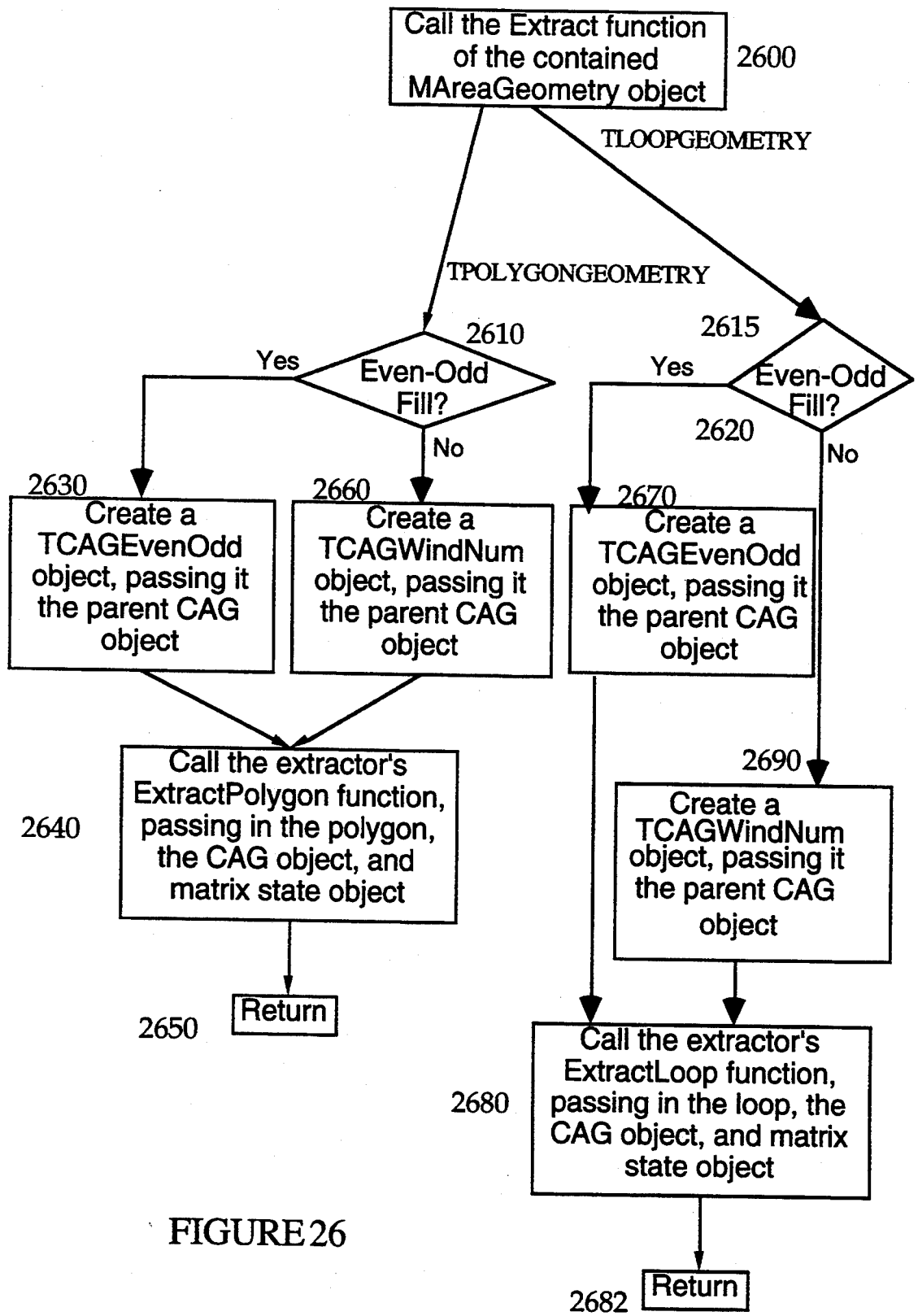
FIG. 26 is a flowchart setting forth the detailed logic in accordance with a preferred embodiment.

FIG. 26 is a flowchart setting forth the detailed logic in accordance with a preferred embodiment. Processing commences at function block 2600 where the extract function of the contained area object is called. Then, if the area object is a polygon geometry, a test is performed at decision block 2610 to determine if the graphic is an even-odd fill pattern. If so, then an even odd object is created and the parent CAG object is passed to the created object in function block 2630, the area is processed in function block 2640 and control is returned in terminal 2650. If the graphic is not an even-odd fill pattern in decision block 2610, then in function block 2660 a winding number object is created and the parent CAG object is passed to the created object in function block 2660, the area is processed in function block 2640 and control is returned in terminal 2650. If the area object is a loop (closed curve) geometry, a test is performed at decision block 2615 to determine if the graphic is an even-odd fill pattern. If so, then an even-odd object is created and the parent CAG object is passed to the created object in function block 2670, the area is processed in function block 2680 and control is returned in terminal 2682. If the graphic is not an even-odd fill pattern in decision block 2615, then in function block 2690 a winding number object is created and the parent CAG object is passed to the created object in function block 2680, the area is processed in function block 2680 and control is returned in terminal 2682.

Figure 27:
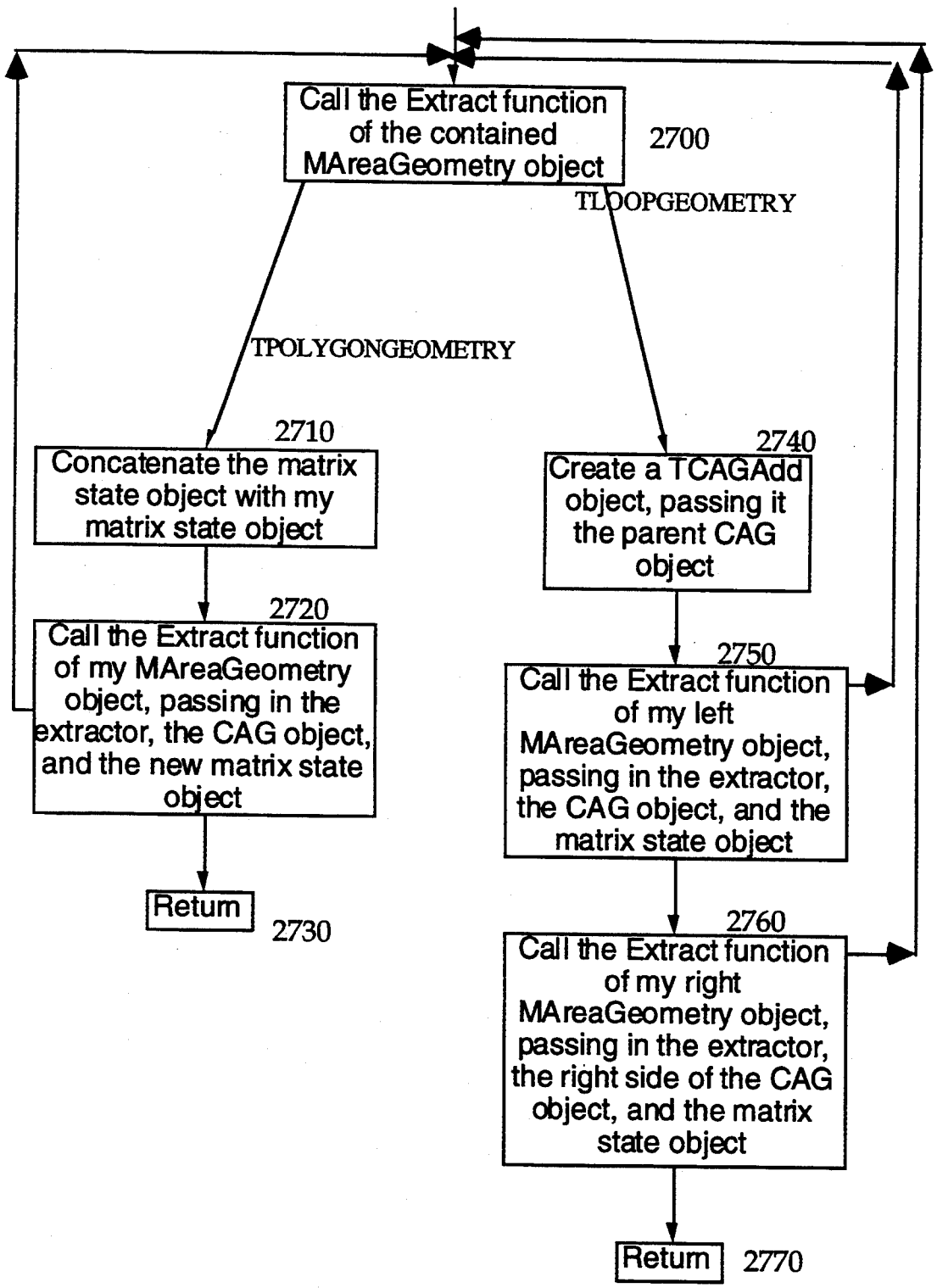
FIG. 27 is a flowchart setting forth the detailed logic in accordance with a preferred embodiment.

FIG. 27 is a flowchart setting forth the detailed logic in accordance with a preferred embodiment. Processing commences at function block 2700 where the extract function corresponding of the contained area is called. Then, if the extract function is transformed geometry, then at function block 2710 the transform is applied to the contained area, at 2720 the extract function is applied to the contained area and processing is completed at terminal 2730. If the extract function is add geometry, then the parent object is passed to the created object in function block 2750. Then the extract function is called on a first (left) and a second (right) object as shown in function block 2750 and 2760. Finally, processing is completed at terminal 2770.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method for combining a plurality of graphic geometries stored as a hierarchy of graphic objects in an object-oriented operating system, said objects including logic and data defined by a plurality of classes on a computer with a storage and an attached display, comprising the steps of:

(a) defining a first class in said storage representative of a plurality of geometric figures including logic and data representative of basic geometries;
(b) creating a second class in said storage representative of a plurality of geometric figure operations including logic and data for performing union, difference, intersection and exclusive-or of said first class geometries;
(c) creating a third class in said storage including logic and data for accepting a plurality of first classes and a plurality of second classes and generating a data structure containing said plurality of graphic geometries stored as a hierarchy of objects in said object-oriented operating system;
(d) applying a geometric figure operation to a first and a second geometric figure to create a resultant geometric figure by extracting a pair of first classes from said data structure and applying a second class to said pair of first classes to generate said resultant geometric figure;
(e) repeating step (d) until a root is encountered in said data structure containing said plurality of graphic geometries stored as a hierarchy of objects in said object-oriented operating system; and
(f) displaying said resultant geometric figure on said display.

2. A method as recited in claim 1, including the step of defining a class in the storage representative of an add geometric figure operation.

3. A method as recited in claim 1, including the step of defining a class in the storage representative of an exclusive-or (XOR) geometric figure operation.

4. A method as recited in claim 1, including the step of defining a class in the storage representative of a subtract geometric figure operation.

5. A method as recited in claim 1, including the step of defining a class in the storage representative of an intersect geometric figure operation.

6. A method as recited in claim 1, including the step of defining classes in the storage representative of an ellipse geometric figure.

7. A method as recited in claim 1, including the step of defining classes in the storage representative of a rectangle geometric figure.

8. A method as recited in claim 1, including the step of defining classes in the storage representative of a polygon geometric figure.

9. A method as recited in claim 1, including the step of defining classes in the storage representative of a loop geometric figure.

10. A method as recited in claim 1, including the step of defining classes in the storage representative of a glyph run geometric figure.

11. A method as recited in claim 1, including the step of representing the graphic objects polymorphically.

12. A method as recited in claim 1, including the step of determining whether any scan line pixels are inside or outside said graphic object.

13. A method as recited in claim 13, including the step of processing said graphic objects utilizing even-odd processing.

14. A method as recited in claim 13, including the step of processing said graphic objects utilizing winding-number processing.

15. A method as recited in claim 1, including the step of representing the plurality of geometric figures polymorphically.

16. An apparatus for combining a plurality of graphic geometries stored as a hierarchy of graphic objects in an object-oriented operating system, said objects including logic and data defined by a plurality of classes, comprising:
(a) a processor;
(b) a storage attached to and under control of the processor;
(c) a display attached to and under control of the processor;
(d) means for defining a first class in said storage representative of a plurality of geometric figures including logic and data representative of basic geometries;
(e) means for creating a second class in said storage representative of a plurality of geometric figure operations including logic and data for performing union, difference, intersection and exclusive-or of said first class geometries;
(f) means for creating a third class in said storage including logic and data for accepting a plurality of first classes and a plurality of second classes and generating a data structure containing said plurality of graphic geometries stored as a hierarchy of objects in said object-oriented operating system;
(G) means for applying a geometric figure operation to a first and a second geometric figure to create a resultant geometric figure by extracting a pair of first classes from said data structure and applying a second class to said pair of first classes to generate said resultant geometric figure;
(h) repeating step (g) until a root is encountered in said data structure containing said plurality of graphic geometries stored as a hierarchy of objects in said object-oriented operating system; and
(i) means for displaying said resultant geometric figure on said display.

17. An apparatus as recited in claim 16, including means for defining a class in the storage representative of an add geometric figure operation.

18. An apparatus as recited in claim 16, including means for defining a class in the storage representative of an exclusive-or (XOR) geometric figure operation.

19. An apparatus as recited in claim 16, including means for defining a class in the storage representative of a subtract geometric figure operation.

20. An apparatus as recited in claim 16, including means for defining a class in the storage representative of an intersect geometric figure operation.

21. An apparatus as recited in claim 16, including means for defining classes in the storage representative of an ellipse geometric figure.

22. An apparatus as recited in claim 16, including means for defining classes in the storage representative of a rectangle geometric figure.

23. An apparatus as recited in claim 16, including means for defining classes in the storage representative of a polygon geometric figure.

24. An apparatus as recited in claim 16, including means for defining classes in the storage representative of a loop geometric figure.

25. An apparatus as recited in claim 16, including means for defining classes in the storage representative of a glyph run geometric figure.

26. An apparatus as recited in claim 16, including means for representing said graphic objects polymorphically.

27. An apparatus as recited in claim 26, including means for representing said graphic objects in an extensible manner.

28. An apparatus as recited in claim 27, including means for processing said graphic objects utilizing even-odd processing.

29. An apparatus as recited in claim 27, including means for processing said graphic objects utilizing winding-number processing.

30. An apparatus as recited in claim 16, including means for determining whether any scan line pixels are inside or outside the graphic object.

* * * * *